US008651057B1

(12) United States Patent
Welsh

(10) Patent No.: US 8,651,057 B1
(45) Date of Patent: Feb. 18, 2014

(54) PHOTOGRAPHIC ANIMAL COUNTER FOR MONITORING MOVEMENT OF AQUATIC ANIMALS

(75) Inventor: Stuart A. Welsh, Morgantown, WV (US)

(73) Assignee: The United States of America, as represented by the Secretary of the Interior, Washington, DC (US)

( * ) Notice: Subject to any disclaimer, the term of this patent is extended or adjusted under 35 U.S.C. 154(b) by 264 days.

(21) Appl. No.: 13/212,540

(22) Filed: Aug. 18, 2011

Related U.S. Application Data

(60) Provisional application No. 61/376,012, filed on Aug. 23, 2010.

(51) Int. Cl.
A01K 61/00 (2006.01)

(52) U.S. Cl.
USPC .......................... 119/200; 119/215

(58) Field of Classification Search
USPC ................ 119/200, 215, 216, 247, 416–417; 340/573.1–573.3; 405/81, 83
See application file for complete search history.

(56) References Cited

U.S. PATENT DOCUMENTS

| | | | | |
|---|---|---|---|---|
| 3,040,980 A * | 6/1962 | Mann et al. | ....................... | 377/6 |
| 3,096,600 A * | 7/1963 | Gwyther | ....................... | 43/100 |
| 4,095,092 A * | 6/1978 | Neff | ....................... | 377/6 |
| 5,823,140 A | 10/1998 | Pittet et al. | ....................... | 119/174 |
| 6,161,504 A * | 12/2000 | Jungling et al. | ....................... | 119/215 |
| 6,273,639 B1 * | 8/2001 | Eikrem et al. | ....................... | 405/83 |
| 2008/0137104 A1 | 6/2008 | Lillerud et al. | | |

FOREIGN PATENT DOCUMENTS

| | | |
|---|---|---|
| EP | 0984391 A1 | 3/2000 |
| JP | 3783835 | 3/2006 |

OTHER PUBLICATIONS

Beaumont, W.R.C., C.A. Mills, and G.I. Williams. 1986. Use of a microcomputer as an aid to identifying objects passing through a resistivity fish counter. Aquaculture and Fisheries Management 17:213-226.
Braithwaite, H. 1971. A sonar fish counter. Journal of Fish Biology 3:73-82.
Dunkley, D.A., and W.M. Shearer. 1982. An assessment of the performance of a resistivity fish counter. Journal of Fish Biology 20:717-737.
Ewing, Rd., M.D. Evenson, E.K. Birks. 1983. Infrared fish counter for measuring migration of juvenile salmonids. Progressive Fish-Culturist 45:53-55.

(Continued)

Primary Examiner — Rob Swiatek
Assistant Examiner — Ebony Evans
(74) Attorney, Agent, or Firm — C. Joan Gilsdorf

(57) ABSTRACT

A movement monitoring device to monitor and record movement of animals through an aquatic animal passage system, regardless of water turbidity. A housing connected to the aquatic animal passage system has an entrance to receive an animal and an exit for the animal to leave the housing. A ramp within the housing has a lower end and an upper end, and the lower end is positioned at the entrance. A platform within the housing has one end connected to the upper end of the ramp and the other end positioned at the exit. The platform is elevated so that water from the aquatic animal passage system flows underneath the platform, and the animal climbs up the ramp, out of the water, and onto the platform. A photographic system focused on the platform records an image of the animal on the platform out the water.

18 Claims, 8 Drawing Sheets

(56) References Cited

OTHER PUBLICATIONS

Liscom, K.L., and C.D. Volz. 1975. Impedance bridge fish counter. Progressive Fish Culturist 37:39-42.

Reddin, D.G., M.F. O'Connell, and D.A. Dunkley. 1992. Assessment of an automated fish counter in a Canadian river. Aquaculture and Fisheries Management 23:113-121.

Shardlow, T.F. and K.D. Hyatt. 2004. Assessment of the counting accuracy of the Vaki infrared counter on Chum salmon. North American Journal of Fisheries Management 24:249-252.

Smith, I.P., A.D.F. Johnstone, and D.A. Dunkley. 1996. Evaluation of a portable electrode array for a resistivity fish counter. Fisheries Management and Ecology 3:129-141.

Fish Counting Equipment, Commerce Business Daily, PSA #2913, Aug. 13, 2001, <http://www.fbodaily.com/cbd/archive/2001/08(August)/13-Aug-2001/spmsc016.htm>, accessed Jun. 22, 2010.

The Riverwatcher Fish Counter, Vaki Aquaculture Systems, Ltd., <http://www.vaki.is/Products/RiverwatcherFishCounter/>, accessed Jun. 22, 2010.

Camera System, Vaki Aquaculture Systems, Ltd., <http://www.vaki.is/Products/RiverwatcherFishCounter/CameraRW/>, accessed Jun. 22, 2010.

Lee Baumgartner, et al., Assessment of an infrared fish counter (Vaki Riverwatcher) to quantify fish migrations in the Murray-Darling Basin, Jan. 2010, <http://www.dpi.nsw.gov.au/__data/assets/pdf__file/0005/322970/AE__2010__Output-1629__Baumgartner-et-all__Vaki-Riverwatcher-report__REPORT.pdf>.

C.P. Ruggles, Guidelines for sampling fish in inland waters, Ch 10: Sampling migrating salmon, FAO corporate document repository, EIFAC/T33, 1980, <http://www.fao.org/DOCREP/003/AA044E/AA044E11.htm>.

\* cited by examiner

PHOTOGRAPHIC ANIMAL COUNTER FOR MONITORING MOVEMENT OF AQUATIC ANIMALS

CROSS-REFERENCE TO RELATED APPLICATION(S)

This application is related to and claims the benefit of priority to Provisional Application U.S. Ser. No. 61/376,012, entitled "Photographic Animal Counter for Monitoring Movement of Aquatic Animals," by Stuart A. Welsh, filed Aug. 23, 2010 in the U.S. Patent and Trademark Office, the contents of which are incorporated herein by reference.

STATEMENT OF GOVERNMENT INTEREST

The invention described herein may be manufactured, used, and licensed by or for the U.S. Government for governmental purposes without payment of any royalties thereon.

BACKGROUND

The present invention relates in general to fish counters.

Scientists monitor the movement of aquatic animals for various reasons, including the determination of environmental influences on upstream migration. Fish counters are often used to monitor animal movement and may be positioned at fishways on dams to count the number of fish passing through the fishways. Additional data often needed to manage populations of certain types of fish, such as the American eel, include the date and time of passage of each individual through an area, identification of the species of animal passing through an area, and estimates of body length/size of all individuals passing through an area.

However, periods of turbid (i.e., muddy) water conditions can interfere with the collection of data. Water turbidity limits the ability to observe fish underwater in their natural environment. Trapping fish is labor-intensive and may interfere with the behavior of the fish. Remotely-operated electronic monitoring devices, while overcoming the limitations of manual trapping, are still adversely affected by water turbidity. For example, the beams emitted from optical scanners that use infrared light may attenuate and not be detected, impairing the functioning of the scanner and interfering with achieving an accurate count of the number of fish passing through an area. Also, photographs taken in turbid water may not be clear, which interferes with identification of the animals and estimates of body size.

Thus, a need exists for an improved fish monitoring device that monitors aquatic animals such as the American eel without being limited by water turbidity.

SUMMARY

The photographic counter, also referred to as a "movement monitoring device," described herein ameliorates many of the shortcomings of current fish counters. The photographic counter is used to photograph, count, and record the date/time of passage of aquatic animals using fishways on dams in either clear or turbid water. The invention is not restricted to fishes or dams, and could be used to photograph, count, and record the date/time of passage through an aquatic environment of any small aquatic animal, including invertebrates, amphibians, reptiles, and small mammals. Also, the invention allows for the recovery of tag data for marked animals (i.e., animals with external tags used in mark-recapture studies).

In accordance with an embodiment of the invention, there is provided a movement monitoring device to monitor movement of animals through an aquatic animal passage system, such as a fishway. The movement monitoring device includes a housing connected to the aquatic animal passage system. The housing has an entrance for an animal passing through the aquatic animal passage system to enter the housing, and an exit for the animal to leave the housing. A ramp within the housing has a lower end and an upper end, the lower end is positioned at the entrance. A platform within the housing has one end connected to the upper end of the ramp and the other end positioned at the exit. The platform is elevated so that water from the aquatic animal passage system flows underneath the platform. The animal climbs up the ramp, out of the water, and onto the platform. A photographic system focused on the platform records an image of the animal on the platform above the water.

BRIEF DESCRIPTION OF THE DRAWINGS

Various aspects and advantages of the present invention will become apparent and more readily appreciated from the following description, appended claims, and accompanying drawings, of which:

DETAILED DESCRIPTION OF THE PREFERRED EMBODIMENTS

The present disclosure describes a photographic animal counter, also referred to as a "movement monitoring device," for monitoring movement of aquatic animals through an existing aquatic animal passage system and taking clear photographs in either clear or turbid water conditions.

Figure 1:
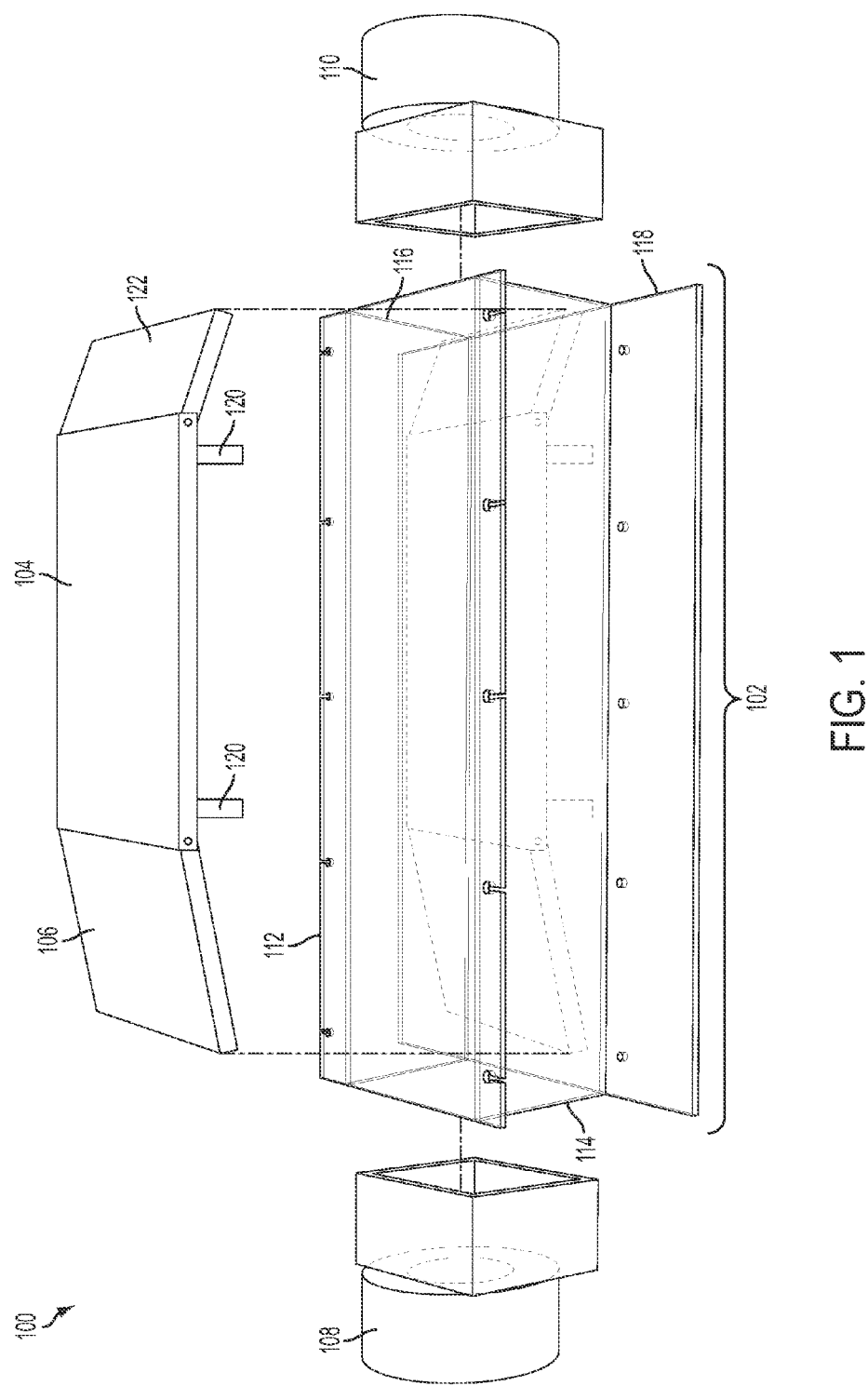
FIG. 1 is a partially exploded view of a movement monitoring device embodying the principles of the invention.

The embodiment shown in FIG. 1 illustrates a movement monitoring device 100 having a rectangular-shaped, transparent housing 102, a platform 104 with a ramp 106, and end connectors 108 and 110. The housing 102 has a removable lid 112, front and back sides 114 and 116, and a floor or base 118. The connectors 108, 110 attach to the left and right sides of the housing 102 and are used to splice the housing 102 into a pipe or other conduit that passes water and aquatic animals, often referred to as a "fish ladder" or "fishway" (hereinafter referred to as a "fishway").

The platform 104 is fitted inside the housing 102 and is connected to the ramp 106 at one end of the platform 104.

Generally, the widths of the ramp 106 and the platform 104 are similar to the inside dimensions of the housing 102 to conveniently fit securely within the housing 102. The platform 104 is elevated using legs 120, which allows passing animals to move through the housing 102 at an elevation higher than that of the level of water flowing through the fishway pipe.

Using one ramp 106 at one end of the platform 104 restricts movement of animals to a single direction. Alternatively, a second ramp 122 can be located at the other end of the platform 104 for bi-directional passage of animals, or it can have a shorter length and a steeper slope than the length and slope of ramp 106 for uni-directional movement. The lengths and slopes of the ramp 106 and the second ramp 122 may be varied depending on the animal of interest.

The lid 112, the front side 114, the back side 116, and the floor 118 are made of a transparent material, preferably a transparent thermoplastic such as Plexiglas® acrylic sheets. Representative compositions of other parts of the housing 102, the platform 104, the ramp 106, and the connectors 108 and 110 include metals such as steel, copper, and the like; concrete; plastics such as thermoplastic and other polymeric compositions including polyvinylchloride, polyethylene, and polypropylene; and combinations and composites of these and other materials.

Figure 2:
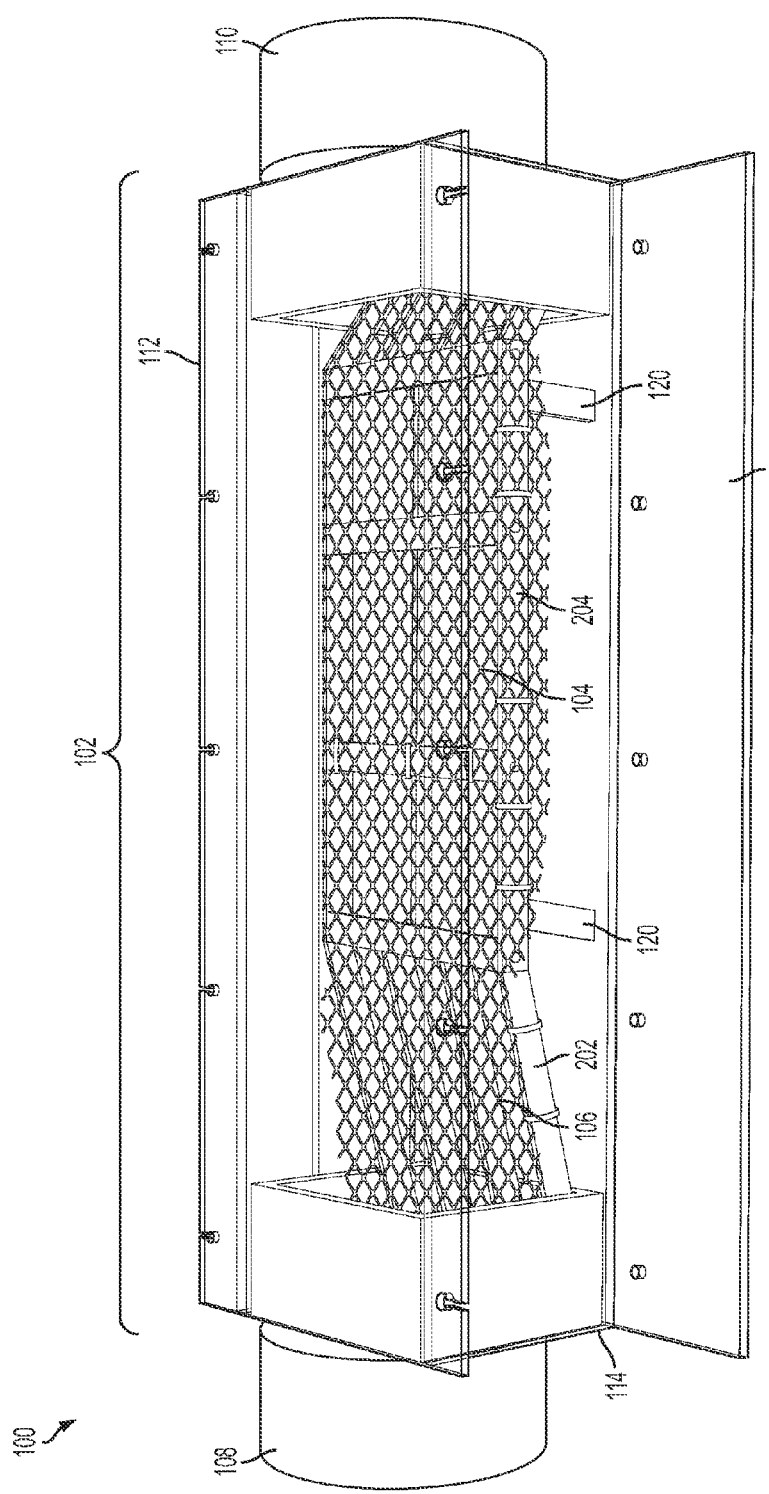
FIG. 2 shows a front perspective view of the movement monitoring device of FIG. 1.

Referring to FIG. 2, the platform 104 and the ramp 106 are constructed using a frame 202 (also see FIG. 4), and are covered with a mesh 204. The lower ends of the ramp 106 meet the floor 118 of the housing 102, but the platform 104 is elevated allowing water to pass through the mesh of the ramp 106 and underneath the platform 104. The water passing through the fishway and the movement monitoring device 100 is either pumped or gravity fed.

Figure 3:
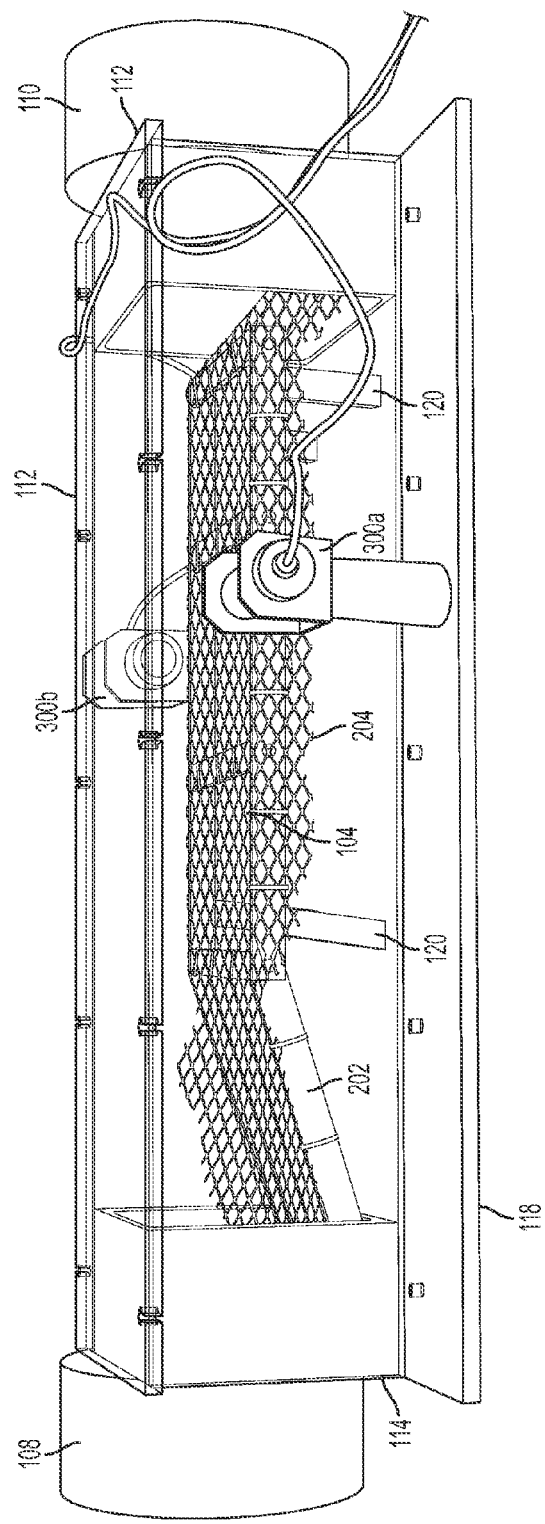
FIG. 3 depicts the movement monitoring device of FIG. 2 with a motion-activated sensor attached to a floor of a housing.
Figure 4:
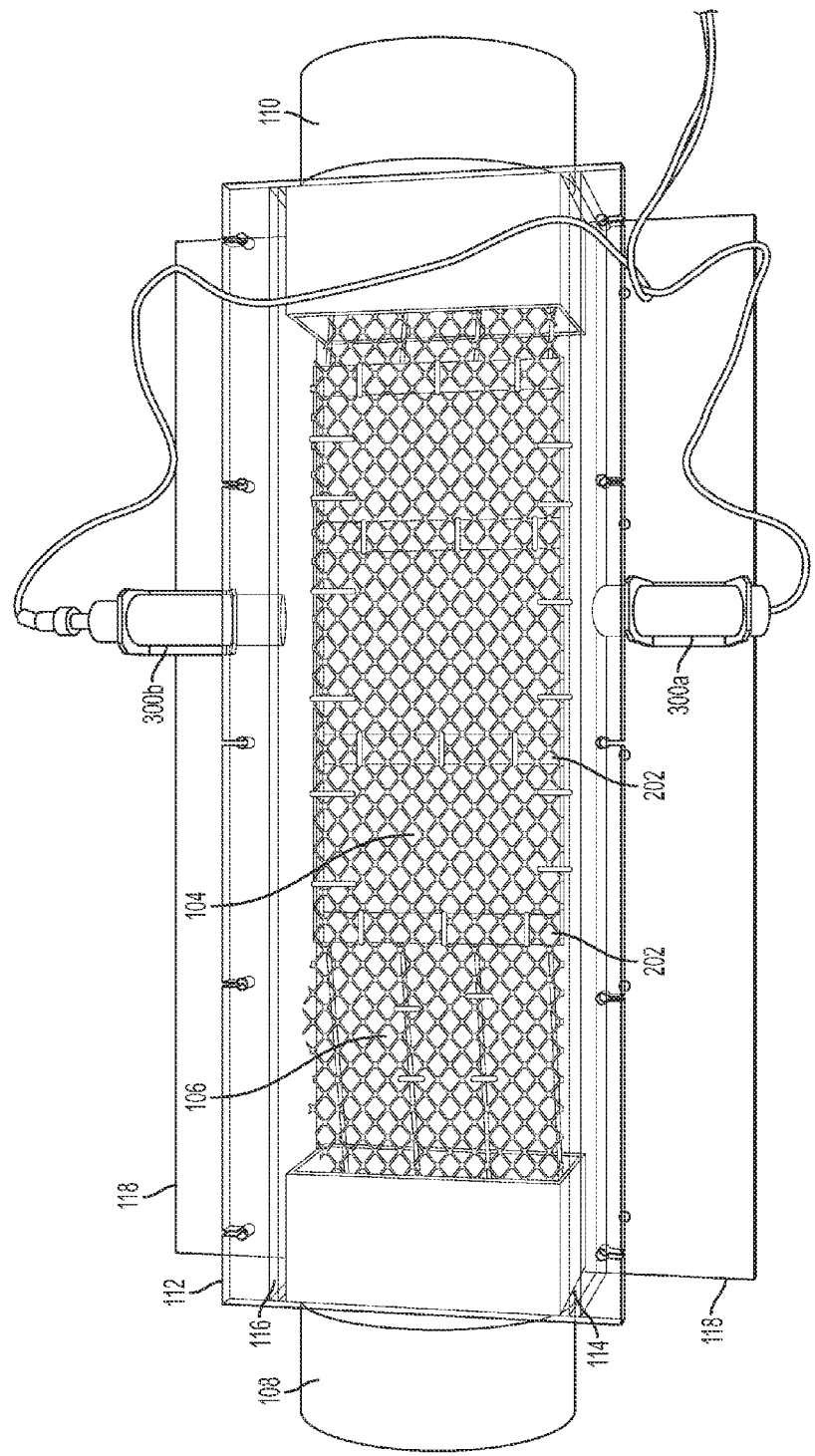
FIG. 4 is a top view of the movement monitoring device shown in FIG. 3.
Figure 5A:
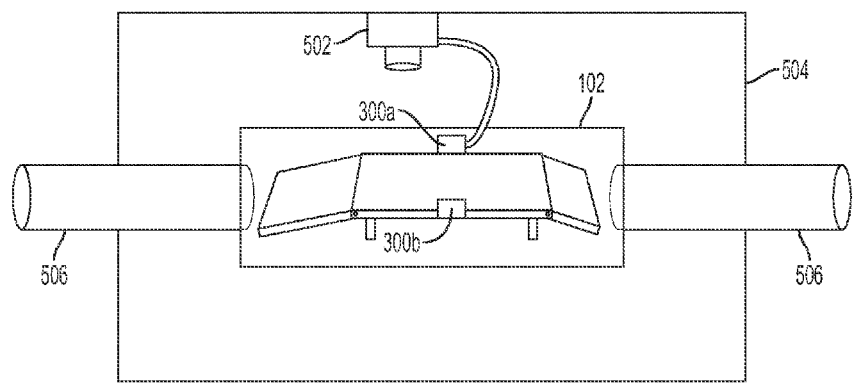
FIG. 5A is a schematic view of the movement monitoring device of FIG. 3 within a container with a camera pointed towards a platform within the housing.
Figure 5B:
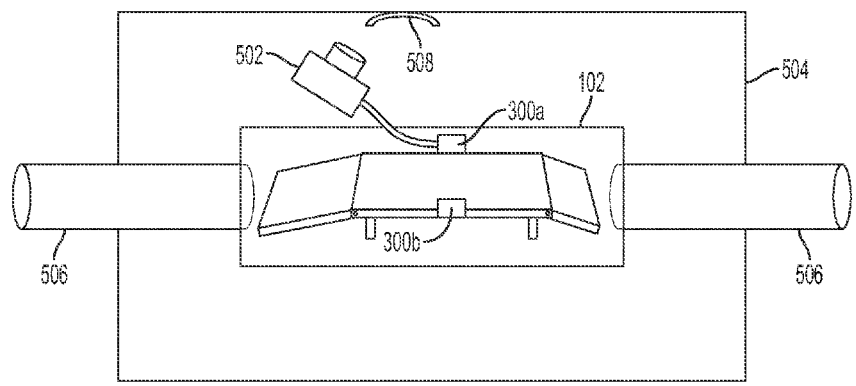
FIG. 5B is a schematic view of the movement monitoring device of FIG. 3 within a container with a camera pointed towards a mirror mounted to a ceiling of the container.

As shown in FIGS. 3 and 4, the front and back sides 114, 116 of the housing 102 are transparent to allow for a motion-activated sensor 300 having a transmitter 300a and a receiver 300b, located on the floor 118 outside of the housing 102, to detect an animal moving through the inside of the housing 102. Referring to FIGS. 5A and 5B, the lid 112 is transparent to allow for a digital motion sensor-activated camera or video recorder 502, located on the outside of the movement monitoring device 100, to record an image of an animal passing through the housing 102. The camera or video recorder 502 (hereinafter referred to as "camera") is connected to the motion-activated sensor 300 and records the images when the motion-activated sensor 300 is triggered. The camera 502 can be positioned above the lid 112 of the movement monitoring device 100 and point downwards toward the platform 104. For example, as shown in FIG. 5A, the movement monitoring device 100 can be placed inside a container 504, which has been spliced into a fishway pipe 506, with the camera 502 mounted to the ceiling of the container 504. Alternatively, as shown in FIG. 5B, the camera 502 can be positioned alongside the movement monitoring device 100 and point upwards toward a mirror 508 mounted to the ceiling of the container 504. The use of the mirror 508 allows for an extended focal length when space is limited.

The lid 112, the platform 104, and the ramp 106 of the movement monitoring device 100 are removable. The lid 112 is fastened to the top of the housing 102 using a latching or fastening mechanism, such as elasticized cord (not shown), for example. The fastening mechanism is placed near the borders of the lid 112 so that the view of the lid 112 by the camera 502 is not obstructed. Removability of the lid 112, the ramp 106, and the platform 104 allows for periodic cleaning and removal of algal growth, as algal growth on the inside of the housing 102 inhibits transparency. Further, algal growth on the ramp 106 and the platform 104 reduces the size of the openings of the mesh 204 and, thus, reduces the passage of water.

The dimensions of the movement monitoring device 100 are selected based upon the size of the aquatic animals of interest. The size of the mesh 204 must be small enough to prevent the animals of interest from passing through the mesh 204 because they must move across the top of the platform 104 to trigger the motion-activated sensor 300 of the camera 502. Also, the mesh size must be large enough to allow water to pass through the mesh 204 of the ramp 106 while remaining under the platform 104.

Animals of interest passing through the movement monitoring device 100 in an upstream or downstream direction move up the meshed ramp 106 and across the meshed platform 104. An animal passing through the movement monitoring device 100 is above the water flow when on the platform 104, which allows for the motion-activated sensor 300 to work even when the water passing through is turbid. Turbid water, which reduces visibility, is common in many aquatic systems, especially during periods of elevated water levels or discharge. The motion-activated sensor 300 is positioned along the side of the housing 102 and directed across and just above the meshed platform 104 so that it is triggered when an animal moves across the platform 104. While the distance of the motion-activated sensor 300 above the platform 104 is dependent upon the size of the animals of interest, the preferred position is approximately 0.25 to 0.50 inches above the platform 104, which allows for monitoring of a wide range of sizes of animals.

The camera 502 has a remote trigger connection and is connected to the motion sensor 300 to control the camera shutter. The camera 502 must be able to focus on the platform 104 and record the date and time of the picture or video recording. The camera 502 is positioned above the housing 102 and points downward, or it can be positioned next to the housing 102 and point upwards toward the mirror 508. The beam from the infrared or laser trigger of the motion sensor 300 is positioned to cross slightly above the meshed platform 104 so that an animal moving across the top surface of the platform 104 will interrupt the beam and trigger the camera shutter. The photograph of each animal that passes through the housing 102 is saved, for example, on the camera's flash card.

Figure 6:
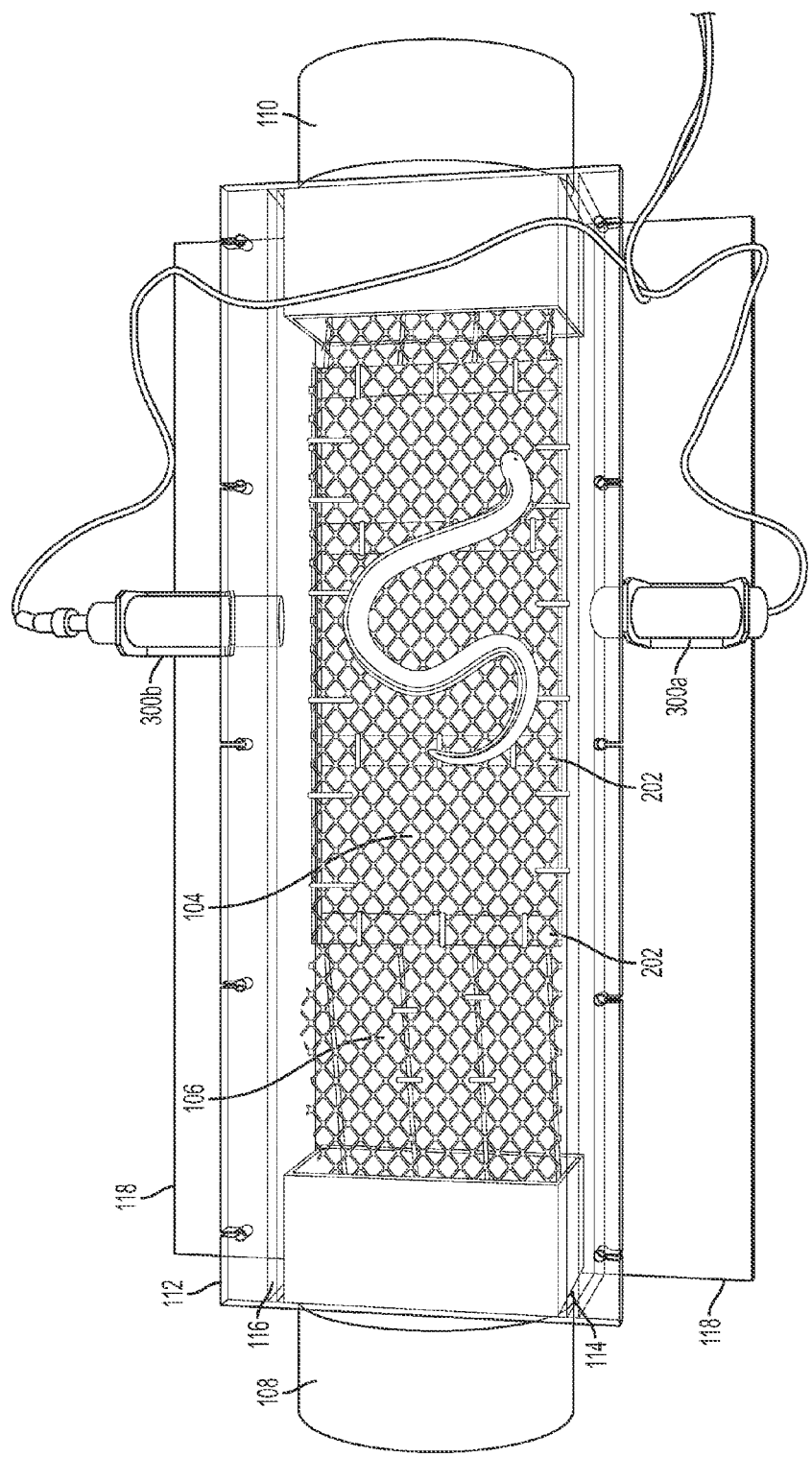
FIG. 6 depicts the movement monitoring device shown in FIG. 4 with an eel on a platform.
Figure 7:
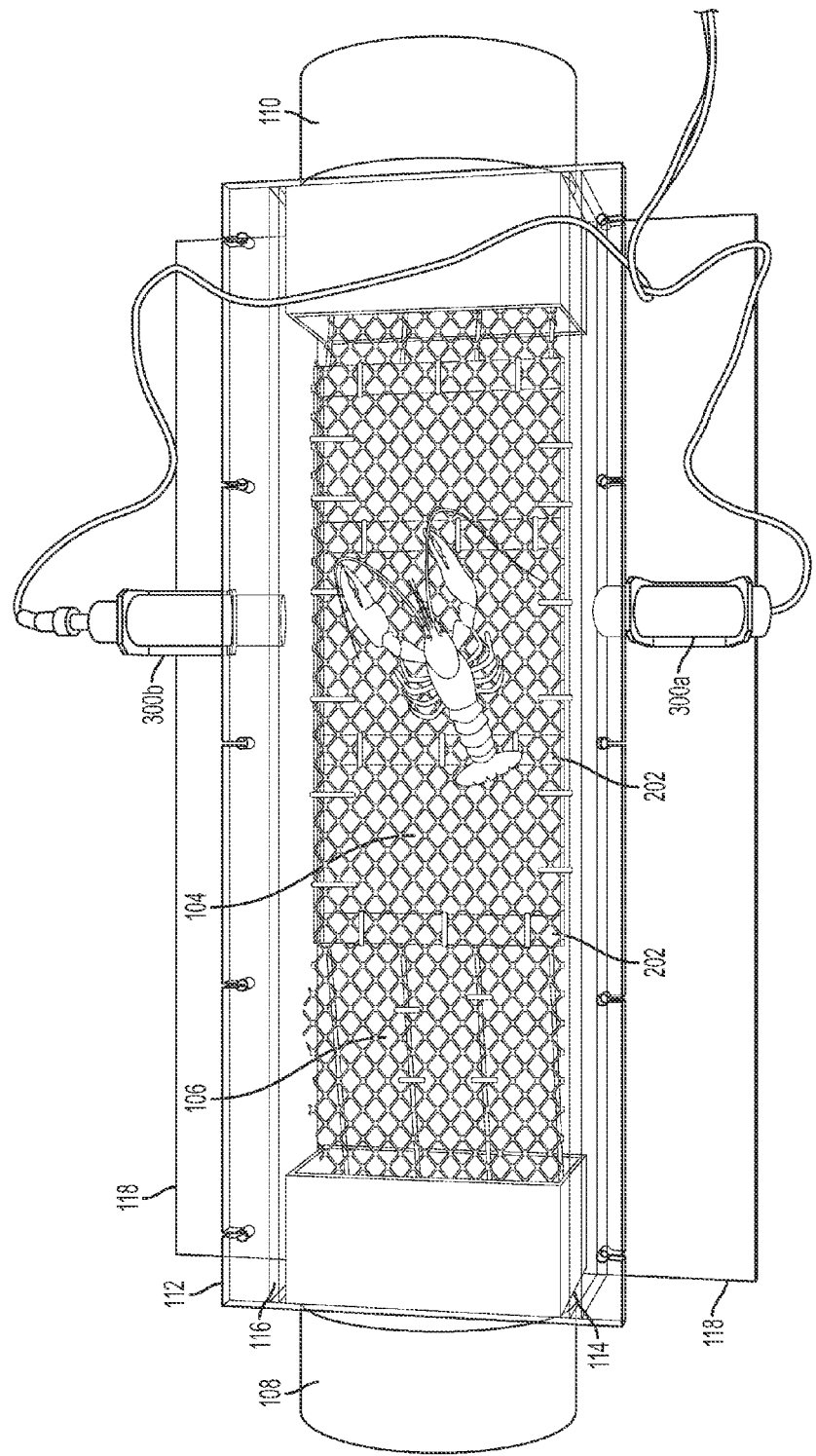
FIG. 7 depicts the movement monitoring device shown in FIG. 4 with a crayfish on the platform.

The movement monitoring device 100 resolves the problem of water turbidity (i.e., the clarity of the water due to suspended solids). Specifically, the meshed platform 104 positioned above the water level enables fish such as eels, which have serpentine motion, to move up the ramp 106 and across the platform 104 and be photographed out of the water. Eels generally are cued to upstream migration by increases in river flows, and increases in river flow are generally linked to increases in water turbidity. Thus, most eels move upstream in turbid water conditions. The infrared beam from a scanner or motion sensor may not be able to penetrate through water having high turbidity. The movement monitoring device 100 resolves this problem by directing the eel out of the turbid water and onto the ramp 106. The infrared beam of the motion sensor 300 is positioned out of the water and just above the platform 104 so that the infrared beam passes through air rather than through the water. The eel passing across the platform 104 "breaks" the beam and triggers the camera shutter (see FIG. 6). The movement monitoring device 100 can be used to monitor movements of other aquatic animals such as water snakes and crayfish (see FIG. 7).

The data collected on animals passing through the movement monitoring device 100 by the camera 502 include the time and date that the animal passed through. Determination of the size of the animal, the species of animal, and the number of animals that passed through are possible through manual observation of the recorded images. Also, in studies where animals are marked dorsally with external tags, the picture or video recorded image will provide the recovery of tagging data. Alternatively, a passive integrated transponder (PIT) tag reader (not shown) can be used with the movement monitoring device 100 to read internal animal tags.

The size of the animal passing through is estimated from the image of the picture or video recording. Using a known distance for a reference, such as mesh width of the platform 104, the length, width, or other measurements of anatomical parts of the animal of interest can be estimated. Estimation of length, width, or other measurements of anatomical parts can be accomplished by manual measurements of printed images, or can be done electronically on a computer with various known software packages. The species identification is determined from the picture or video recorded image of the animal using anatomical features and readily available species identification manuals.

In some studies, it is important to count the number of individual animals passing through within a period of time, such as daily, monthly, or yearly counts. Each picture or video recorded image will generally represent an individual animal, so the number of animals passing through can be counted, and the recorded date/time information is then used to determine the number of individuals within a selected time period. In some cases, more than one individual may pass through at the same time, and in those cases, the recorded image can be used to determine the total count of individuals.

The movement monitoring device provides several advantages, including the following:

(1) photographing each individual passing through an area, allowing remote data collection;

(2) recording the date and time of each individual passing through an area;

(3) identification of the species of animal passing through an area, providing species verification via the photographs;

(4) determining a total count of all individuals passing through an area, and a total count of the number of individuals of each species passing through the area;

(5) detection of animals having a small body depth, for example, migrant eels having a body depth of less than 20 mm;

(6) estimation of sizes of all individuals passing through an area; and (7) recovery of tag data in the case of marked animals.

In addition, the movement monitoring device does not require the animal to be submerged in water when photographs are taken and, thus, facilitates clear photographic documentation of each animal during either clear water conditions or during periods of turbid water conditions.

EXAMPLE

The present invention will be understood more readily by reference to the following example, which is provided by way of illustration and is not intended to be limiting of the invention. Those skilled in the art will recognize, or be able to ascertain, using no more than routine experimentation, numerous equivalents to the specific substances and procedures described herein.

Figure 8:
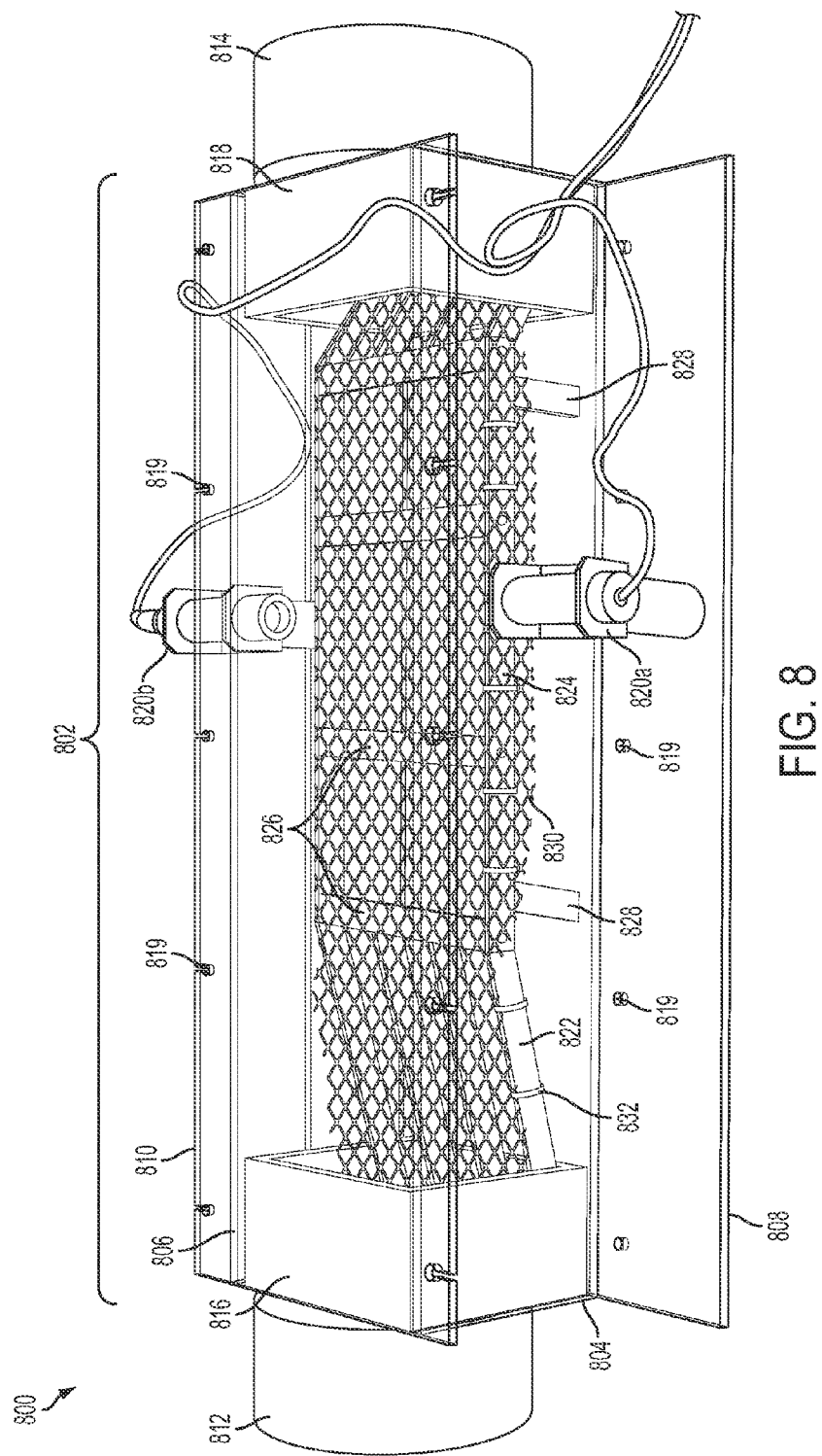
FIG. 8 shows a top perspective view for explaining an example of constructing the movement monitoring device of FIG. 3.

Referring to FIG. 8, a movement monitoring device 800 for monitoring movement of aquatic animals was constructed having a rectangular housing 802 with front and back sides 804 and 806, a floor 808, and a lid 810 made from 0.22-inch sheets of transparent thermoplastic. Connectors 812, 814 attached to the ends of the housing 802 were schedule 40 PVC 3×4×4-inch downspout adapters. Each downspout adapter 812, 814 had one rectangular end 816, 818 of 3.5×4.5 inches and a 4.5-inch outside diameter circular end which was coupled to 4-inch diameter PVC pipe in a fishway using a flexible pipe coupling.

The front and back sides 804, 806 were cut to 18-inch length and 3.5-inch width, the lid 810 was 18-inch length and 6.5-inch width, and the floor 808 was 18-inch length and 10-inch width. The lid 810 and the floor 808 were cut to extend beyond the distance between the two sides 804, 806 so that elastic fasteners (not shown) could be installed by connection through holes 819 from the floor 808 to the lid 810. Also, motion sensor devices 820*a*, 820*b* were connected to the floor 808 on the outside of the housing 802.

A waterproof glue appropriate for use with thermoplastic and PVC material was used for construction. The front and back sides 804, 806 were glued at each end to the 3.5-inch sides of the downspout adapters 812, 814. The floor 808 was glued at each end to the bottom of the 4.5-inch side of the rectangular ends 816, 818 of the downspout adapters 812 and 814, and to the bottom of each of the front and back sides 804 and 806. Lengths of 1-inch wide×0.25-inch thick rubberized weather stripping (not shown) cut at the same length as the length and width of the lid 810 were adhered to the underside of the lid 810 centered along the contact point of the lid 810 and the top of the front and back sides 804 and 806, as well as across the ends of the lid 810, which provided a water tight gasket seal when the lid 810 was fastened to the top of the housing 802.

The total length of the movement monitoring device 800 was 21.75 inches measured from the circular ends of the downspout adapters 812 and 814, and the inside measurements of the housing 802 were 4.5 inches wide by 3.5 inches in height. A 4.375-inch wide ramp 822 and platform 824 were constructed with a frame 826 of 0.5-inch wide×0.0625-inch depth aluminum (using aluminum rivets). The platform 824 was elevated with aluminum legs 828 of the same dimensions so that the platform 824 was 2.25 inches above the floor 808. A plastic mesh 830 of 0.33-inch mesh width was attached to the frame 826 using zip ties 832, and covered the entire surface of the ramp 822 and the platform 824.

The movement monitoring device 800 was spliced into a section of 4-inch schedule 40 PVC pipe located at the top of a fishway, which was installed on the downstream side of a dam. The pipe and attached movement monitoring device 800 were sloped at 10 degrees. River water was pumped into the top of the fishway, which was connected to the pipe, and gravity flow owing to the 10 degree slope allowed the water to run through the pipe and the attached movement monitoring device 800. To prevent theft or vandalism, the section of pipe containing the movement monitoring device 800 was housed inside a stainless steel box (not shown in FIG. 8) with a lockable front door, where 4-inch diameter holes in the sides of the stainless steel box allow entry and exit of the 4-inch pipe.

The camera system was an Olympus® E-300 Evolt single lens reflex (SLR) camera (not shown in FIG. 8), manufactured by Olympus America, Inc. of Center Valley, Pa., with built-in flash and a 50 mm 1:2 macro lens connected to a Phototrapper motion sensor system using infrared motion sensors manufactured by Phototrap of Amado, Ariz. Two infrared motion sensors 820*a*, 820*b* were mounted centrally (one on each side) on the extended floor 808 outside of the housing 802, and directed across the mesh platform 824 at an elevation of 0.25 inches above the mesh platform 824. The camera was positioned next to the housing 802, and angled upward toward a mirror (not shown in FIG. 8) mounted on the ceiling of the stainless steel box. The flash on the camera was turned on to illuminate darkness inside the stainless steel box. An electrical power outlet was mounted inside the stainless steel box, and both the camera and the motion sensor system were powered using the electrical outlet.

In this example, the system was designed to obtain data on American eels, although when the movement monitoring device 800 was deployed, images were also recorded of crayfish and water snakes. The digital images were recorded on a 2 GB compact flash card, which allowed for 9,999 images to be recorded at a resolution size of 640×480 pixels. In this example, the movement monitoring device 800 recorded data on the time and date that American eels passed through. Also, through manual data collection from the recorded images, data were obtained on the size of each eel, and the number of eels that passed daily.

Thus, it will be appreciated by those skilled in the art that modifications and variations of the present invention are possible without departing from the principles and spirit of the invention, the scope of which is defined in the appended claims and their equivalents.

What is claimed is:

1. A movement monitoring device to monitor movement of animals through an aquatic animal passage system, the movement monitoring device comprising:
   a housing connected to an aquatic animal passage system, the housing having an entrance for an animal passing through the aquatic animal passage system to enter the housing, and an exit for the animal to leave the housing;
   a ramp within the housing having a lower end and an upper end, the lower end positioned at the entrance;
   a platform within the housing, one end of the platform connected to the upper end of the ramp and the other end of the platform positioned at the exit, the platform being elevated so that water from the aquatic animal passage system flows underneath the platform, the animal moving up the ramp, out of the water, and onto the platform; and
   a photographic system focused on the platform to record an image of the animal on the platform above the water.

2. The movement monitoring device of claim 1, wherein the platform comprises a plurality of legs to elevate the platform above the water.

3. The movement monitoring device of claim 2, wherein the housing further comprises:
   a floor, the lower end of the ramp and the legs of the platform resting on the floor;
   a front side and a back side, each having a top end, the ramp and the platform positioned between the front side and the back side; and
   a lid placed on the top ends of the front side and the back side to cover the ramp and the platform.

4. The movement monitoring device of claim 3, wherein a bottom of the platform is approximately 2.25 inches above a top of the floor.

5. The movement monitoring device of claim 3, wherein the photographic system comprises:
   a motion-activated sensor with a transmitter and a receiver located on either side of the platform to detect the animal moving across the platform; and
   a camera connected to the motion-activated sensor that records the image of the animal out of the water, the date, and the time when the motion-activated sensor detects the animal moving across the platform.

6. The movement monitoring device of claim 5, wherein the distance of the motion-activated sensor above a top of the platform is approximately 0.25 inches to 0.50 inches.

7. The movement monitoring device of claim 5, wherein:
   the lid, the front side, and the back side are transparent;
   the lid and the floor are wider than the distance between the front side and the back side;
   the floor is wider than the width of the lid; and
   the motion sensor is connected to the floor outside the front side and the back side.

8. The movement monitoring device of claim 5, wherein the movement monitoring device is spliced into a section of pipe located at the aquatic animal passage system.

9. The movement monitoring device of claim 8, wherein the section of the pipe containing the movement monitoring device is housed inside a container, the container having sides and holes in the sides thereof to allow entry and exit of the pipe.

10. The movement monitoring device of claim 9, wherein the camera is attached to an inside of the container above the lid and pointed downward towards the platform.

11. The movement monitoring device of claim 9, wherein the container has a mirror mounted on a ceiling of the container and the camera is attached to the floor and pointed upward towards the mirror to extend focal length.

12. The movement monitoring device of claim 1, wherein the ramp and the platform are constructed from a frame and covered with a mesh, the mesh and the frame allowing the water to pass through the ramp and underneath the platform, and the mesh aiding the animal in climbing up the ramp and across the platform.

13. The movement monitoring device of claim 12, wherein the size of the mesh is small enough to prevent the animal from passing through the mesh, but large enough to allow the water to pass through the ramp and under the platform.

14. The movement monitoring device of claim 12, wherein a width of the mesh is approximately 0.33 inches.

15. The movement monitoring device of claim 1, further comprising connectors positioned at the entrance and the exit of the housing to attach the housing to the aquatic animal passage system.

16. The movement monitoring device of claim 1, wherein the aquatic animal passage system is a fishway or a fish ladder.

17. The movement monitoring device of claim 1, further comprising a second ramp connected to the platform at the exit for bi-directional passage of animals.

18. A movement monitoring device to monitor movement of animals through an aquatic animal passage system, the movement monitoring device comprising:
   a housing connected to an aquatic animal passage system, the housing having an entrance for an animal passing through the aquatic animal passage system to enter the housing, and an exit for the animal to leave the housing;
   a ramp within the housing having a lower end and an upper end, the lower end positioned at the entrance;
   a platform within the housing having a front end, a back end, a first side, and a second side, the front end of the platform connected to the upper end of the ramp and the back end of the platform positioned at the exit, the platform having a plurality of legs to elevate the platform so that water from the aquatic animal passage system flows underneath the platform allowing the animal to move up the ramp, out of the water, and onto the platform;
   a motion-activated sensor with a transmitter and a receiver located, respectively, on the first side and the second side of the platform to detect the animal moving across the platform; and a camera connected to the motion-activated sensor that records the image of the animal on the platform above the water, the date, and the time when the motion-activated sensor detects the animal moving across the platform.

\* \* \* \* \*